United States Patent
Dalphy et al.

(10) Patent No.: US 6,550,021 B1
(45) Date of Patent: Apr. 15, 2003

(54) INTERNET-IMPLEMENTED METHOD SUPPORTING COMPONENT REPAIR SERVICES

(75) Inventors: Lawrence J. Dalphy, Mission Viejo, CA (US); Thomas R. Harbert, Orange, CA (US); David M. Smith, Laguna Niguel, CA (US)

(73) Assignee: Western Digital Ventures, Inc., Lake Forrest, CA (US)

( * ) Notice: Subject to any disclaimer, the term of this patent is extended or adjusted under 35 U.S.C. 154(b) by 0 days.

(21) Appl. No.: 09/410,361

(22) Filed: Sep. 30, 1999

(51) Int. Cl.$^7$ ................................................. G06F 11/00
(52) U.S. Cl. .......................................... 714/11; 714/27
(58) Field of Search ............................. 714/11, 1–4, 17, 714/19, 25, 26, 27, 31, 32, 38, 39, 44, 43, 48

(56) References Cited

U.S. PATENT DOCUMENTS

| | | | | |
|---|---|---|---|---|
| 6,163,805 A | * | 12/2000 | Silva et al. | 709/227 |
| 6,167,537 A | * | 12/2000 | Silva et al. | 714/46 |
| 6,252,597 B1 | * | 6/2001 | Lokuge | 345/353 |
| 6,266,788 B1 | * | 7/2001 | Othmer et al. | 714/38 |
| 6,341,212 B1 | * | 1/2002 | Shende et al. | 434/350 |
| 6,341,310 B1 | * | 1/2002 | Leshem et al. | 709/223 |
| 6,360,268 B1 | * | 3/2002 | Silva et al. | 709/227 |

* cited by examiner

Primary Examiner—Nadeem Iqbal
(74) Attorney, Agent, or Firm—Milad G. Shara, Esq.; Howard H. Sheerin, Esq.

(57) ABSTRACT

An internet-implemented method of supports a component repair service. The service is rendered for a component of a computer that has an interface for communicating with a web site via the internet. While communicating via the internet, the computer operates under a first operating system that has a protection feature that precludes application-level programming from performing a function to test the component. The method comprises running a first program on the first operating system to cause a display prompt for input control to initiate a test of the component. The method comprises responding to the input control by: exiting from the first operating system and entering a second operating system; running a second program on the second operating system to perform an in situ test of the component to generate a test result; and responding to the test result to store a recorded test result. The method comprises exiting from the second operating system and entering the first operating system; and transmitting to the web site information based on the recorded test result.

9 Claims, 3 Drawing Sheets

INTERNET-IMPLEMENTED METHOD SUPPORTING COMPONENT REPAIR SERVICES

BACKGROUND OF INVENTION

1. Field of Invention

In general, this invention relates to a method of rendering repair services for a hardware component of a computer that has an interface for communicating with a remote web site via the internet. More particularly, a method according to the invention provides an in situ, web-site controlled test (i.e., the hardware component is in its end user configuration at a site remote from the web site).

2. Description of the Related Art

Original Equipment Manufacturers (OEMs) of computer systems and their customers frequently face the problem of determining whether a computer hardware component has failed and, if so, in what way. Too often, a computer hardware component that is fully functional is misdiagnosed as the source of an apparent system problem, is unnecessarily removed from the system and shipped back to the OEM or the manufacturer of the computer hardware component, only to be tested to find "no defect found" (NDF). Substantial expense for all concerned arises from the large number of such NDFs. Furthermore, the process of removing computer hardware component often leads to damage to it or other parts of the system. In addition, manufacturers incur substantial expenses in providing "help lines" by which trained technicians receive incoming calls from direct and indirect customers to discuss perceived problems, give advice on how to determine the source of the problem, and where deemed appropriate to authorize the return of a suspect computer hardware component pursuant to a return material authorization ("RMA").

Such OEMs generally procure various computer hardware components from various suppliers and assemble the computer hardware components to make the products they sell. These computer hardware components include electronic components such as integrated circuits including memory chips, and include electromechanical components such as disk drives including hard disk drives.

Owing to the tremendous increase in use of the internet, the products such OEMs currently sell are generally internet ready in that they include modems, whether for cable service, for plain old telephone service, or for digital subscriber line service. These products also include a protected operating system program such as the various versions of a protected operating system program Microsoft Corporation distributes under the name "Windows." These products also include an unprotected operating system program such as the various versions of a unprotected operating system program Microsoft Corporation distributes under the name "MS DOS."

In addition to the above-mentioned two different types of operating system programs, a computer system used by an end user generally includes a browser program that can be regarded either as an element of the protected operating system program or as an application program. Whether considered as an element of the protected operating system program or as an application program, the browser program must conform to certain safeguarding requirements established by the protected operating system program, and these safeguarding requirements prevent the execution of certain diagnostic tests that can be performed in situ only under an unprotected operating system such as an MS DOS operating system program.

Computer programs called "test suites" presently exist for testing the condition of a device in situ. Test suites for hard disk drives compatible with the host interface often referred to as "ATA" or "IDE" are based on either individual software run on unprotected operating systems such as DOS. Western Digital Corporation, the assignee hereof, has distributed to the public on disks and through downloading via the internet from a web site, for each of a number of models of its hard disk drives, a test suite that is written to execute under an unprotected operating system program such as MS DOS to perform an in situ test of a hard disk drive; during such in situ test, the hard disk drive is controlled to enter a special mode often referred to in the drive industry as a "native mode" whereby certain information about the drive that in normal mode is inaccessible is accessible in native mode.

To execute such a test suite a user needs to load it from a floppy disk or from a CD-ROM. or through existing applications software, and execute it under DOS. Many users find it confusing and difficult and time consuming to read and follow complicated instructions to perform a series of manually initiated processes to exit Windows, load DOS, run the test suite, and make note of the result. In addition the correct diagnostic is not easily accessible because the correct floppy or CD-ROM with the correct diagnostic revision needs to be present. The effectiveness of the diagnostics executed with this method often depends on application software which does not communicate directly with the device under test. This configuration allows for other failing devices or software conflicts to obstruct effective testing of the selected device.

There is a need for a method by which a customer, particularly an ordinary person not expert in computer technology, can quickly, easily, and accurately determine whether a computer hardware component has failed. There is a need for a method by which a customer can quickly, easily, and accurately communicate with a service provider to obtain authorization to return a computer hardware component that has failed.

SUMMARY OF THE INVENTION

This invention can be regarded as an internet-implemented method of supporting component repair service. The service is rendered for a component of a computer that has an interface for communicating with a web site via the internet. While communicating via the internet, the computer operates under a first operating system that has a protection feature that precludes application-level programming from performing a function to test the component. The method comprises running a first program on the first operating system to cause a display prompt for input control to initiate a test of the component. The method comprises responding to the input control by: exiting from the first operating system and entering a second operating system; running a second program on the second operating system to perform an in situ test of the component to generate a test result; and responding to the test result to store a recorded test result. The method comprises exiting from the second operating system and entering the first operating system; and transmitting to the web site information based on the recorded test result.

This invention can also be regarded as a web-site controlled method for categorizing a computer component as to whether the computer component is a candidate for return and repair. The computer component is located at a user site remote from the web site as an element of a computer that has an interface for communicating with a web site via the internet. The method comprises generating and transmitting signals to cause a prompt at the user site to initiate an in situ test to categorize the computer component by producing a first test result if and only if the computer component is a candidate for return and repair. The method comprises receiving user input responding to the prompt to cause the test of the computer component. The method comprises generating and transmitting signals to cause an interactive communication by which, if the test produces the first test result, warranty related data about the computer component are received and return instructions and authorization for return are communicated to the remote site.

In a preferred practice of the method, first and second plug-in programs are sequentially installed into a subject computer from a predetermined World Wide Web URL (Uniform Resources Locator) location. Each of these plug-in programs contains executable instructions and appropriate parameter data for the subject computer to carry out a series of process steps substantially entirely automatically with almost no need for user action.

In this automated process, the plug-in programs create a minimum of two temporary auto execute batch files, cause the subject computer to exit all programs including the browser Windows or other protected operating system program, load the unprotected operating system, execute the diagnostic, log the results and re load the original operating system and application software returning to the original browser and URL location. On returning to the URL location, the URL server has access to the logged result. This sequence of events requires very little activity for the customer, basically just the selection of the device to be tested and entry and perhaps reentry of personal ID and password to access the URL location through an internet service provider (ISP).

Preferably, the functional testing of the selected computer hardware component is conducted without interference from other software conflicts or other failing hardware components. This is enabled by the use of a diagnostic program which communicates directly with the BIOS and the device under test with use of the a diagnostic run with operating system instructions. The diagnostic program may be a very short functional test or if selected may be a longer diagnostic with options to perform restoration functions on the selected device.

The amount of time to perform the diagnostic is independent of the users knowledge of computer technology and without requiring a search for and use of utilities or on any floppy disk or CD-ROM. The effectiveness of the diagnostics is also independent of the operating system and application software normally active on the computer system.

Practice of the method of this invention can be applicable to all devices and components utilized in or by a computer system. The diagnostic may or may not be provided by the original equipment manufacture.

DETAILED DESCRIPTION

Figure 1:
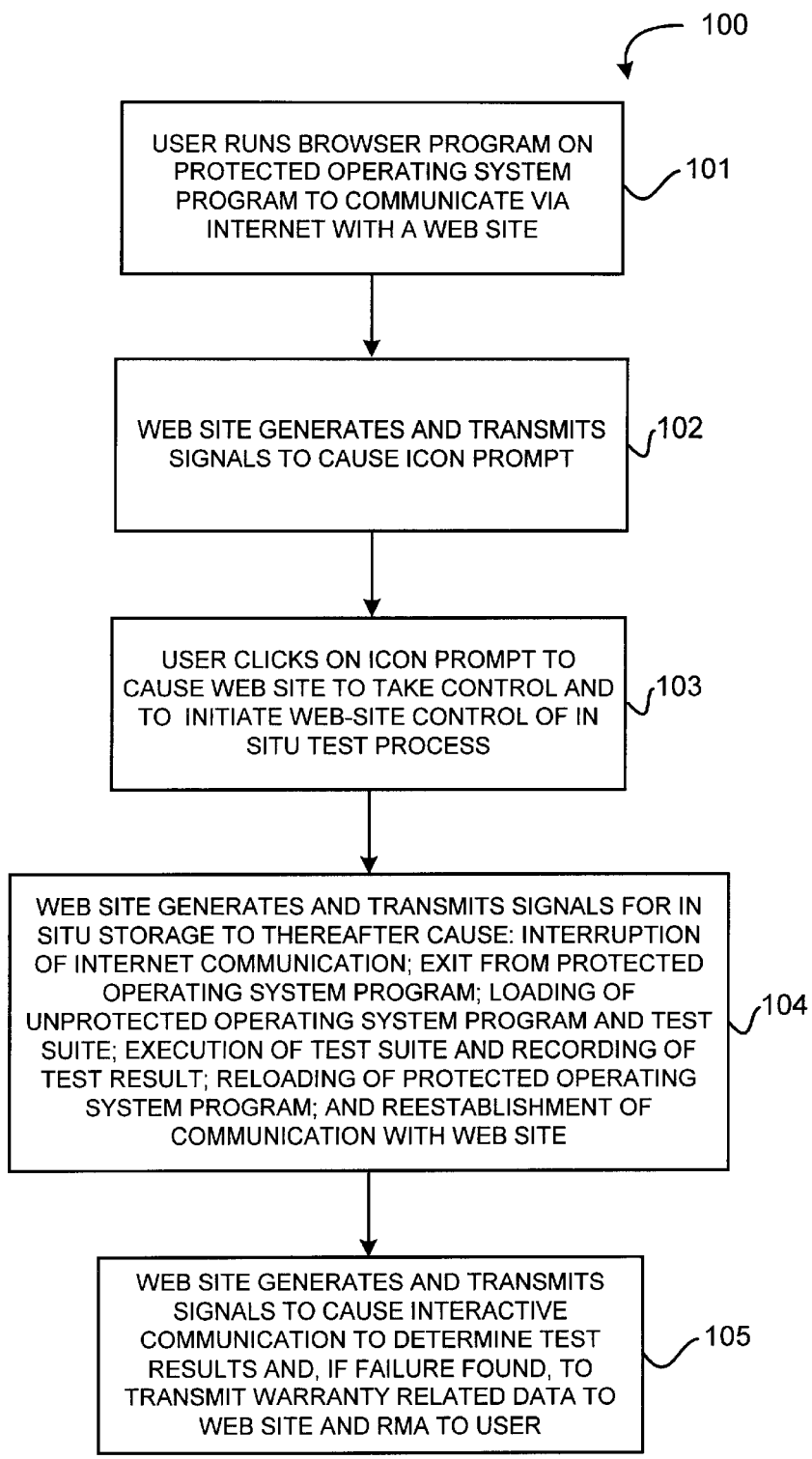
FIG. 1 is a flow chart showing the overall flow of an internet-implemented method that according to the invention provides for web-site control of a sequence of steps for in situ testing to categorize a computer hardware component as to whether it is a candidate for return and repair, and that includes preferred features for automating a complex sequence of entering and exiting operating system programs.

With reference to FIG. 1, a method 100 in accord with a preferred practice of the invention includes a step 101 to start an internet-implemented method according to preferred practice of the invention. Before starting method 100, and while controlling the operation of a computer such as a desktop, laptop, or other computer (the "subject computer"), a person (the "user") will generally have become suspicious that a computer hardware component such as a hard disk drive within the user's computer is not operating properly. To check out the problem, the user runs a browser program on a protected operating system program such as "Windows" (or Linux, UNIX, or other protected operating system program), and through the running of the browser program and the transmission of the URL for a selected web site the user establishes communication with the web site via the internet.

In step 102, the web site having been contacted by the user via the subject computer generates and transmits signals to cause an icon prompt at the subject computer.

In step 103, the user manipulates a mouse or other pointing device and clicks on the icon prompt. This results in signals being transmitted via the internet from the subject computer to the web site; these signals cause the web site to take control over the subject computer and to initiate web-site control of a computer hardware component test process.

In step 104, the web site generates and transmits signals for in situ storage to thereafter cause a sequence of automated steps. As explained more fully below with reference to FIG. 2, these signals cause: interruption of internet communication between the web site and the subject computer; exit from protected operating system program; a "re-boot" to load an unprotected operating system program and thereafter a loading of a test suite; execution (under the unprotected operating system program) of the test suite and recording of the test result of conducting the in situ test controlled by the test suite; another "re-boot" to reload the protected operating system program; and thereafter a reloading of the browser program and then a largely if not completely automatic reestablishment of communication with the web site.

In step 105, the web site generates and transmits signals to cause interactive communication to determine the test results and, if failure found, to transmit warranty related data to the web site and an RMA to the user.

Figure 2:
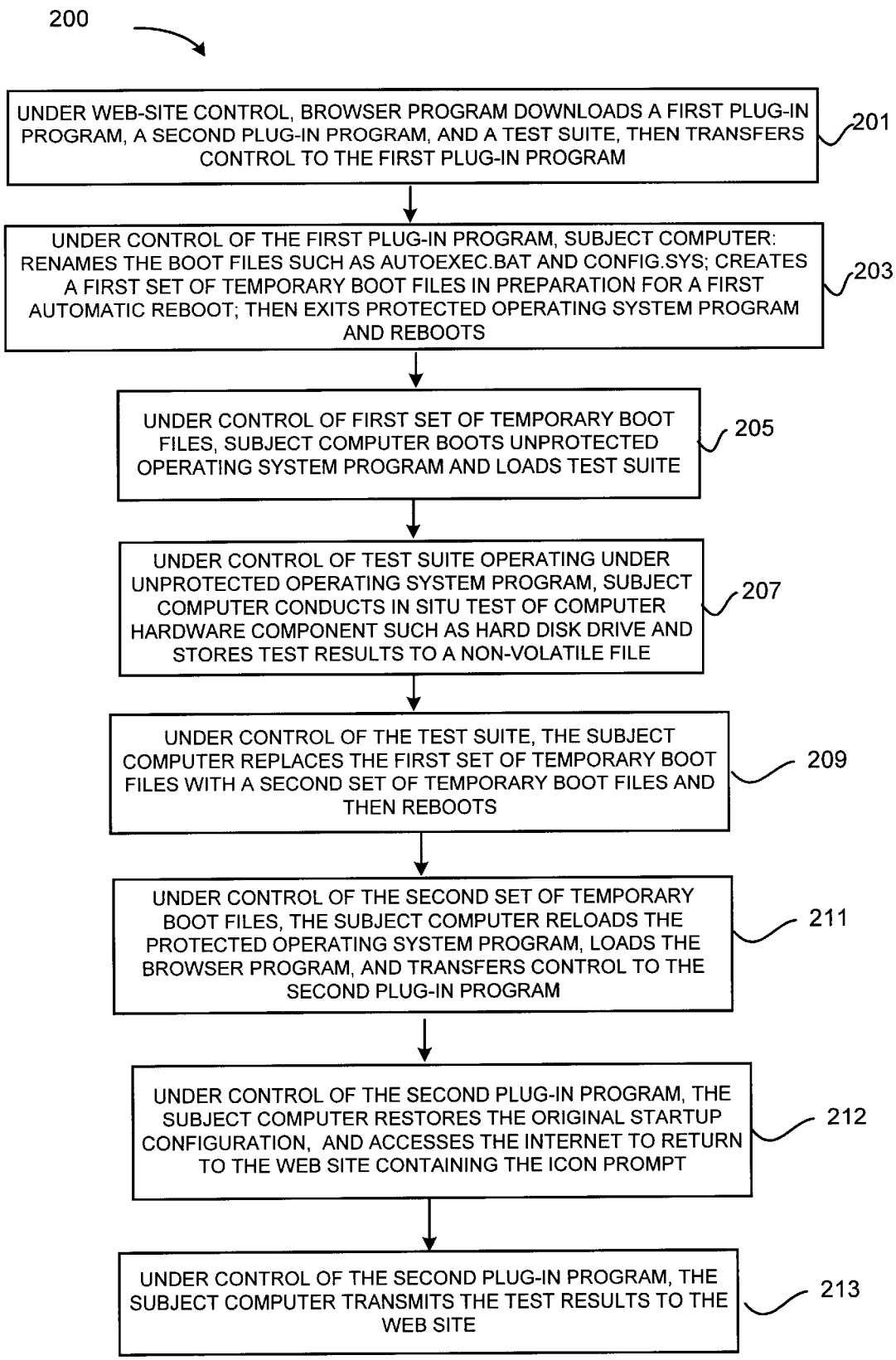
FIG. 2 is a flow chart showing preferred practice of the portion of the method of FIG. 1 relating to web-site control of the subject computer, responsive to clicking on the icon prompt, to cause the automatic in situ test and automatic transmission of the results thereof to the web site.

With reference to FIG. 2, a portion 200 of method 100 relates to web-site control of the subject computer, upon the web site responding to clicking on the icon prompt. Portion 200 automatically causes an in situ test of a computer hardware component such as a hard disk drive, and automatically causes transmission of the results thereof to the web site. Portion 200 includes steps 201, 203, 205, 207, 209, 211, 212, and 213.

In step 201, the browser program causes the subject computer to download a first plug-in program, a second plug-in program, and a test suite, and then transfers control to the first plug-in program.

In step 203, under control of the first plug-in program, the subject computer performs a number of functions. One such function is to rename the boot files such as the AUTOEXEC.BAT file and the CONFIG.SYS file; this preserves the user's original boot configuration which will be restored automatically later in the preferred practice of the process. Another such function is to create a first set of temporary boot files in preparation for a first automatic reboot of the subject computer. After performing the foregoing functions, the first plug-in program causes the subject computer to exit the protected operating system program and to reboot.

In step 205, the subject computer reboots and under control of the first set of temporary boot files loads an unprotected operating system program and thereafter loads the test suite.

In step 207, the subject computer automatically conducts the in situ test of the computer hardware component, doing so under the unprotected operating system program such that the test suite can perform steps not possible under the protected operating system program. In the case of a hard disk drive, the test suite preferably causes the drive to enter a special mode often referred to as a "native mode" whereby access is available to drive-stored data useful in categorizing whether the drive is a candidate for return and repair. In any case, the test suite causes the results of the test to be stored in a non-volatile file.

In step 209, the subject computer, under control of the test suite, replaces the first set of temporary boot files with a second set of temporary boot files and then reboots.

In step 211, the subject computer, under control of the second set of temporary boot files during rebooting, reloads the protected operating system program, and loads the browser program and transfers control to the second plug-in program.

In step 212, under control of the second plug-in program, the subject computer renames the original boot files to their original names so that the subject computer is restored to its original configuration in preparation for eventual rebooting. At this point, if the user needs to provide identifying information such as name and password, the user manually responds to prompts as usual. In any case, the subject computer accesses the internet and returns to the same web site that contains the icon prompt.

In step 213, the subject computer, under control of the second plug-in program, transmits the test results to the web site.

Figure 3:
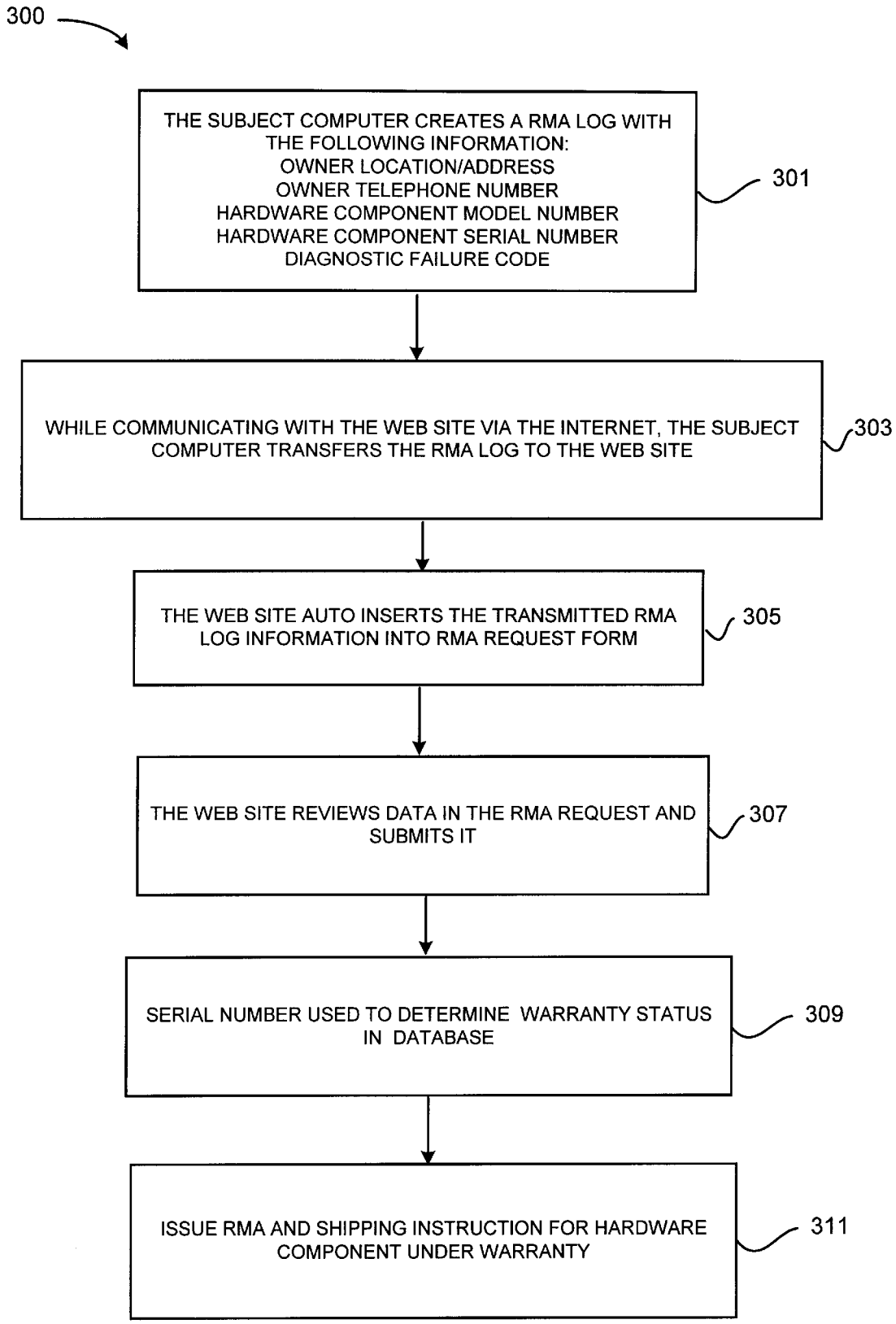
FIG. 3 is a flow chart showing preferred practice of the portion of the method of FIG. 1 relating to web-site control to gather warranty related data about the computer hardware component and selectively to transmit return instructions and authorization for return.

With reference to FIG. 3, a portion 300 of method 100 relates to web-site control of the subject computer to gather warranty related data about the computer hardware component and selectively to transmit return instructions and authorization for return. Portion 300 includes steps 301, 303, 305, 307, 309, and 311.

In step 301, The subject computer creates a RMA log with the following information: Owner location/address; Owner telephone number; Hardware component model number; Hardware component serial number; and Diagnostic failure code.

In step 303, while communicating with the web site via the internet, the subject computer transfers the RMA log to the web site.

In step 305, the web site auto inserts the transmitted RMA log information into RMA request form.

In step 307, the web site reviews data in the RMA request and submits it.

In step 309, the transmitted serial number used to determine warranty status in the central database. In step 311, if the central database indicates that the transmitted serial number is still under warranty, the web site transmits signals to issue a RMA and shipping instruction for the hardware component under warranty.

We claim:

1. An internet-implemented method of supporting the rendering of repair service for a hardware component of a computer that has an interface for communicating with a web site via the internet while operating under a first operating system that has a protection feature that precludes application-level programming from performing a function to test the hardware component, the method comprising:
    (a) the computer running a first program on the first operating system to cause a display prompt for input control to initiate a test of the hardware component; and
    (b) the computer responding to the input control by:
        exiting from the first operating system and entering a second operating system;
        running a second program on the second operating system to perform a test of the hardware component to generate a test result;
        responding to the test result to store a recorded test result;
        exiting from the second operating system and entering the first operating system; and
        transmitting to the web site information based on the recorded test result.

2. The internet-implemented method of claim 1, wherein the hardware component is a hard disk drive.

3. The internet-implemented method of claim 1, wherein the first program is a browser program.

4. The internet-implemented method of claim 3, wherein the browser program downloads a first plug-in program and a second plug-in program from the web site.

5. The internet-implemented method of claim 4, wherein the browser program downloads a test suite from the web site.

6. The internet-implemented method of claim 1, wherein the first program is a browser program and the browser program downloads data from the web site to enable multiple automatic reboots of the subject computer.

7. A web site controlled method for categorizing a computer hardware component as to whether the computer hardware component is a candidate for return and repair, the computer hardware component being located at a user site remote from the web site as an element of a computer that has an interface for communicating with the web site via the internet, the method comprising:
    (a) the computer displaying a prompt for the user to initiate a test program executed by the computer to categorize the computer hardware component by producing a first test result if the computer hardware component is a candidate for return and repair;
    (b) the computer receiving user input responding to the prompt to cause the test program to be executed by the computer to test the computer hardware component; and
    (c) if the test produces the first test result, the computer receiving return data from the web site.

8. The web site controlled method of claim 7, wherein the computer hardware component is a hard disk drive.

9. The web site controlled method of claim 7, further comprising the step of transmitting a serial number identifying the computer hardware component from the user site to the web site.

* * * * *